United States Patent Office 3,651,113
Patented Mar. 21, 1972

3,651,113
COMPLEXES OF ALUMINUM TRICHLORIDE OR BORONTRIFLUORIDE WITH HYDROQUINONE AND PREPARATION THEREOF
Werner Metlesics, Vienna, Austria, and Pius Anton Wehrli, Verona, N.J., assignors to Hoffmann-La Roche Inc., Nutley, N.J.
No Drawing. Continuation-in-part of application Ser. No. 777,199, Nov. 19, 1968, which is a continuation-in-part of application Ser. No. 708,495, Feb. 27, 1968. This application Feb. 5, 1969, Ser. No. 796,911
Int. Cl. C07f 5/06
U.S. Cl. 260—448 R
10 Claims

ABSTRACT OF THE DISCLOSURE

A process for producing chromanols by the reaction of an isoprenol or isoprenol derivatives and a hydroquinone in the presence of borontrifluoride or aluminum trichloride and intermediates in this process.

CROSS REFERENCE TO RELATED APPLICATIONS

This application is a continuation-in-part of our pending application Ser. No. 777,199, filed Nov. 19, 1968 and now abandoned, which is a continuation-in-part of our pending application Ser. No. 708,495, filed Feb. 27, 1968 and now abandoned.

BACKGROUND OF THE INVENTION

Chromanols of the formula:

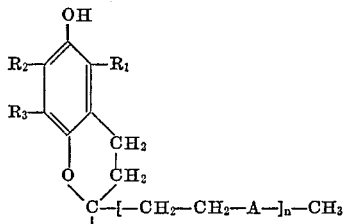

I wherein A is $-CH_2-CH-$ or $-CH=C-$
$\qquad\qquad\qquad\quad\ \ |\qquad\qquad\quad\ \ |$
$\qquad\qquad\qquad\ \ CH_3\qquad\qquad\ CH_3$ $n$ is an integer of from 0 to 9; and $R_1$, $R_2$ and $R_3$ are hydrogen or methyl, which include such compounds as vitamin E, are important and valuable additives for foodstuffs and vitamin preparations. Because of their use as additives in foodstuffs and vitamin preparations, they are required to be of high purity.

In the past, the chromanols of Formula I above have been mostly prepared by condensing an isoprenol and a hydroquinone at elevated temperatures in the presence of zinc chloride and hydrochloric acid. It has been found that by carrying out this reaction under these conditions, undesirable side products form which contaminate the final product. It is believed that the high temperatures utilized in this reaction cause the formation of by-products such as compounds having a five-membered ring fused to a benzene nucleus, and compounds wherein the methyl group is shifted from the 2-position of the chromane ring to a different position on this ring. The formation of these undesirable side products is very disadvantageous since these side products are very difficult and expensive to remove in order to provide the chromanol of Formula I above in the purified and uncontaminated state necessary for use as an additive.

Another disadvantage of utilizing the aforementioned procedure to produce the chromanols of Formula I above is that in order for the reaction to proceed, the water formed during this reaction must be removed. Therefore, in this procedure, it is necessary to utilize expensive and time-consuming means, such as azeotropic distillation, to remove the water formed during the reaction.

SUMMARY OF THE INVENTION

In accordance with this invention, we have found that chromanols of the Formula I above can be prepared in high yields and without the formation of undesired and difficult to remove by-products by first reacting an aluminum trichloride or boron trifluoride with a hydroquinone, in the presence of organic solvents which contain a nucleophilic group having less electron donating capacity than phenol, to form a complex, and thereafter reacting said complex with an isoprenoid compound of the formula

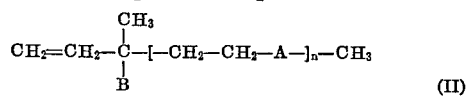

(II)

wherein $n$ and A are as above; and B is hydroxy, halogen or a leaving group, or of the formula:

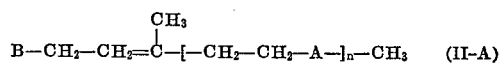

(II-A)

wherein $n$, B and A are as above.

It has been found that by utilizing the process of this invention, the formation of by-products which occurs when high temperatures are utilized is substantially eliminated. In this manner, the chromanols such as vitamin E are produced in high yields and high purity so that costly separating and purifying procedures are not necessary. Furthermore, it has been found that by means of the process of this invention, there is no need to remove the water formed during the reaction thereby eliminating the necessity for expensive separating techniques.

DETAILED DESCRIPTION

The term "halogen" utilized throughout the specification includes all four halogens with bromine, chlorine, and iodine being preferred. The term "lower alkyl" includes both branched and straight chain alkyl groups containing from 1 to 7 carbon atoms such as methyl, ethyl, isopropyl, etc. The term "lower alkoxy" as used throughout the specification includes lower alkoxy groups containing from 1 to 7 carbon atoms such as methoxy, ethoxy, isopropoxy, etc.

The term "aryl" as used throughout the application includes mono-nuclear aryl groups such as phenyl which can be unsubstituted or substituted in one or more positions with a lower alkyl, halogen, an electron donating group, lower alkoxy, amino, nitro, mono-and disubstituted lower alkylamino, etc., or polynuclear aryl groups such as naphthyl, anthryl, phenanthryl, azulyl, etc. which may be unsubstituted or substituted with one or more of the aforementioned groups.

The term "lower alkanoyloxy" as utilized throughout the application includes lower alkanoyloxy groups containing from 1 to 7 carbon atoms such as formyloxy, acetoxy, butyrloxy, etc. The term "aryl lower alkoxy" comprehends aryl lower alkoxy groups wherein the aryl moiety and the lower alkoxy moiety are defined as above. The term "aryl lower alkanoyloxy" comprehends aryl lower alkanoyloxy groups wherein the aryl and lower alkanoyloxy moieties are defined as above. The term "lower alkyl sulfonyloxy" comprehends lower alkylsulfonyloxy groups wherein the lower alkyl moiety is defined as above. The term "aryl sulfonyloxy" comprehends aryl sulfonyloxy groups wherein the aryl moiety is defined as above.

In accordance with this invention, B, in compounds of the Formulae II and II-A above, can be any suitable leaving group such as lower alkoxy, lower alkanoyloxy, aryl lower alkoxy, aryl lower alkanoyloxy, lower alkyl sulfonyloxy, and aryl sulfonyloxy. When B is a lower alkoxy group, the preferred lower alkoxy group is methoxy or ethoxy. When B is a lower alkanoyloxy group, the preferred lower alkanoyloxy group is formyloxy or acetoxy. When B is an aryl lower alkoxy group, the preferred aryl lower alkoxy group is benzyloxy. When B is an aryl lower alkanoyloxy group, the preferred aryl lower alkanoyloxy group is benzoyloxy. The preferred lower alkyl sulfonyloxy group is mesyloxy, and the preferred aryl sulfonyloxy group is tosyloxy.

The process of this invention is carried out by the following reaction scheme:

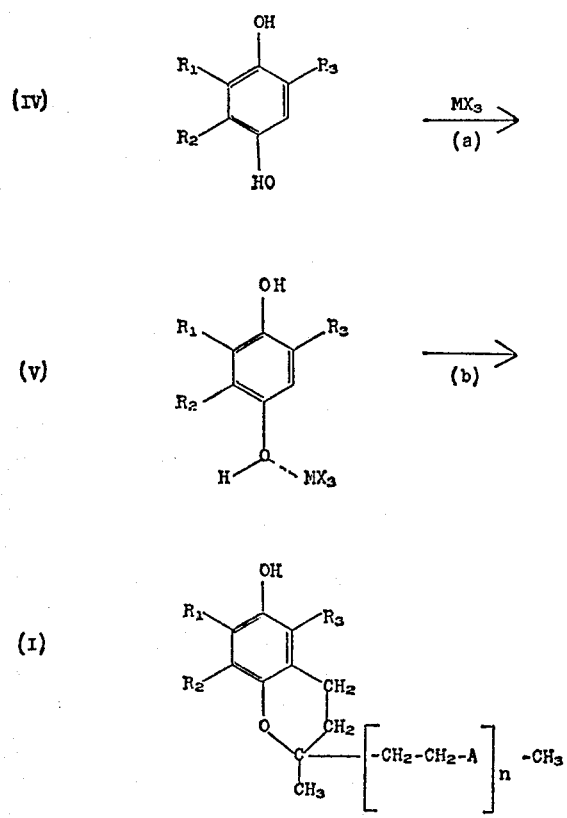

wherein $n$ and A are as above; M is aluminum or boron; X is chlorine or fluorine; and $R_1$, $R_2$ and $R_3$ are hydrogen or methyl with the proviso that when M is aluminum, X is chlorine and with the further proviso that when M is boron, X is fluorine.

The reaction of the hydroquinone with borontrifluoride or aluminum trichloride to form the complex of Formula V above can be carried out at a temperature of below about 40° C. Generally, the reaction of step (a) is carried out at a temperature of from 25° C. to about —100° C. with about 25° C. to —80° C. being preferred.

In carrying out the reaction of step (a), the reaction should be carried out in the presence of an organic solvent which contains a nucleophilic group having less electron donating capacity than phenol. Generally, it is preferred to utilize this nucleophilic containing solvent in an amount of from about 1 to about 5 moles per mole of either borontrifluoride or aluminum trichloride. If desired, an additional inert organic solvent can be utilized as the reaction medium. On the other hand, the nucleophilic solvent can be utilized in amounts sufficient to provide the reaction medium for the reaction of step (a). Any conventional organic solvent containing a nucleophilic group having less electron donating capacity than phenol can be utilized in carrying out the reaction of step (a). Among the nucleophilic groups which these solvents may contain are included amine, nitro, phosphonate, nitrile, phosphine, amide and sulfate groups.

The preferred nucleophilic containing solvents are nitroalkanes containing from 1 to 7 carbon atoms and nitroaryl compounds. Any conventional nitroalkane or nitroaryl compound can be utilized. Among the nitroalkanes which can be utilized are included nitromethane, nitroethane, nitropropane, nitropentane, etc. The aryl group which forms the nitroaryl compound can be a mononuclear aryl group such as phenyl or substituted phenyl (e.g., tolyl, xylyl, mesityl, etc.) as well as polynuclear aryl groups such as naphthyl, etc. Generally, it is preferred to utilize nitrobenzene or o-nitrotoluene as the nitroaryl compound in carrying out this reaction.

In carrying out the reaction of step (a), about one mole of either borontrifluoride or aluminum trichloride is added per mole of the hydroquinone of Formula IV. However, a molar excess of the hydroquinone can be added to the reaction medium, i.e., from about 0.5 to 1 mole of the metallic halide compound per mole of the hydroquinone of Formula IV above.

If desired, an additional solvent can be present along with the nucleophilic solvent to provide the reaction medium. In this regard, any conventional inert organic solvent can be utilized. Among the conventional solvents are included: toluene, hexane, benzene, pentane, methylene chloride, etc.

After the complex of Formula V above is formed by reaction of step (a), the complex of Formula V is reacted with an isoprenoid compound of Formulae II or II–A to form a compound of the Formula I above. If desired, this reaction can be carried out in the presence of a nucleophilic solvent such as those mentioned in connection with step (a). On the other hand, this reaction can be carried out in the presence of any conventional inert organic solvent such as the solvents hereinbefore mentioned. While temperatures as high as 40° C. can be utilized in carrying out the reaction of step (b), it is preferred to utilize a temperature of from 25° C. to —80° C. in carrying out this reaction. Furthermore, in carrying out this reaction, temperatures as low as —100° C. can be utilized depending upon the temperature of solidification of the solvent.

In carrying out the reaction of step (b), 1 mole of the complex of Formula V is condensed with 1 mole of either the compound of Formulae II or II–A. If desired, a molar excess of the complex of Formula V or the isoprenoid compound of Formulae II or II–A can be present in the reaction medium.

Among the isoprenols of Formulae II and II–A which can be condensed with the complex of Formula V above, phytol and isophytol, are preferred. However, the isoprenoid compound can be a 5 carbon atom reagent, or its chain can be lengthened by multiples of 5 carbon atoms, up to a total of 50 carbon atoms. The lengthening of the chain can be effected by incorporation of either saturated or unsaturated 5-carbon atom building blocks. Examples of other alcohols suitable for use in this invention include linalool, geranyl linalool, and farnesylnerolidol and the like.

The following examples are illustrative but not limitative of the present invention.

EXAMPLE 1

Preparation and isolation of trimethylhydroquinone-aluminum-chloride complex 6.64 g. of aluminum chloride powder was weighed into a dry 100 ml. flask and 20 ml. methylene chloride were added, under ice cooling and a slight flow of nitrogen. The temperature was about 5° C. At this temperature, 4.54 g. (4.0 ml.) of nitromethane was dropped in under magnetic stirring. The resulting colorless solution contained a very minor amount of insoluble material. This was removed by filtration under nitrogen over a glass wool packed tubing. To the completely clear filtrate, 7.6 g. of trimethylhydroquinone was added at the temperature of about 5° C. and swirled around until all material was dissolved (under nitrogen, color change to green). After about two minutes, rapid crystallization of the complex was observed. The reaction mixture was allowed to stand without stirring for three hours at room temperature before the crystals were collected under nitrogen.

After two washings of the crystals with 10 and 15 ml. of methylene chloride (always under nitrogen) the crystals were dried directly by use of a high vacuum pump. There resulted a crystalline trimethylhydroquinone-aluminum-chloride complex in a ratio of 1 mole of aluminum chloride to 1 mole of trimethylhydroquinone as crystals, melting with decomposition above 210° C.

EXAMPLE 2

Preparation and isolation of trimethylhydroquinone-borontrifluoride complex 5.00 g. of trimethylhydroquinone was suspended in 50 ml. of dry methylene chloride and 2.6 ml. (2.95 grams) of nitromethane. Under water cooling, a slow stream of borontrifluoride gas is passed into the solution. At first, the suspension turns light green in color. After about one minute, a white precipitate started to crystallize. The borontrifluoride addition is stopped as soon as the saturation point is reached as judged by the white fumes immerging from the attached calcium chloride drying tube. The precipitate was further stirred for 15 minutes. After filtration, under nitrogen, the crystals are washed twice each with 25 ml. methylene chloride. After drying directly on the high vacuum pump, 5.98 g. of white crystals, M.P. 116°–118° C. were obtained.

EXAMPLE 3

Preparation of dl-α-tocopherol

Into a stoppered 3-necked flask (flushed with dry nitrogen) 33.7 g. of aluminum chloride powder was weighed in, and the flask immersed in a cooling bath at 0° C. 250 ml. of methylene chloride was added and the stirred suspension cooled to 0° C. (a slow flow of nitrogen was maintained throughout this procedure). 33.7 ml. of nitromethane was added whereupon all the aluminum chloride went into solution and the temperature rose to 12° C. After the temperature had dropped to 0° C. again, the stirring was stopped and 51.4 g. of trimethylhydroquinone was added through a powder funnel. The stirrer was started again and the solid material went into solution with a change of color to dark green (no rise in temperature was observed). Under continued stirring the contents were cooled to −20° C. After ca. 3–5 minutes a very fine reaction intermediate started to crystallize and it was necessary to increase the speed of stirring. The heat of crystallization increased the temperature about two to three degrees. The color was now a light yellow and its appearance was a readily stirrable slurry. As soon as the temperature reached −20° C., a peristaltic pump was used to add gradually to the reaction flask 100 g. of isophytol (GLC assay 95.7 percent), over 3–4 hours, keeping the feed rate constant and the temperature at −20° C. With increased reaction time, the slurry became thinner. Stirring had to be adjusted from time to time in order to prevent splashing. At the end of the addition, the reaction mixture was a caramel color. Stirring was maintained for another hour at −20° C. before the flask was evacuated (water pump vacuum) and the cooling bath was replaced by a warm water bath (temperature ca. 50° C.) in order to remove the methylene chloride (HCl gas was removed simultaneously). The inside temperature was 20° C. The distillation was stopped when the residue was viscous and only big bubbles appeared (after ca. 35 minutes). To the viscous residue, 100 ml. of hexane was added, the contents were cooled to 0° C. again, and 50 ml. of water then was added in one portion. The temperature rose from 0 to 25° C. When the temperature had reached 20° C. again, an additional 50 ml. of water was added, the cooling bath removed and the contents of the flask (a light brown, thickish emulsion with a flocculent precipitate) was transferred to a separatory funnel and the flask rinsed with 150 ml. of methanol and 50 ml. of hexane. After separation of the two layers, the hexane solution (upper layer) was washed 4 times with 50 ml. of 80% by volume methanol-20% by volume water solution. The aqueous layers in turn were each washed two times with 75 ml. of hexane in a second and third separatory funnel. All three resulting hexane extracts then were combined and evaporated on the rotatory evaporator (bath temperature ca. 60° C.) giving crude dl-α-tocopherol was distilled in a Vigreux column to produce 111.44 grams of pure dl-α-tocopherol (99 to 100% pure). This represented a yield of about 77% based on the isophytol.

EXAMPLE 4

Preparation of dl-α-tocopherol

Into a stoppered 3-necked flask (flushed with dry nitrogen), there was added 51.4 g. of trimethylhydroquinone, 33.7 ml. of nitromethane and 250 ml. of methylene chloride. After cooling to 0° C., a slow stream of borontrifluoride gas was passed into the suspension until 23 grams of the gas was absorbed. Under continuous stirring, the now beige colored slurry was cooled to −20° C. and over a period of 3 hours a total of 100 grams of isophytol was added. After stirring for another hour, the batch was worked up identical to the procedure used given for Example 3. After distillation of the crude product, 111.2 g. of pure dl-α-tocopherol was obtained. This represented a yield of about 77% based on isophytol.

EXAMPLE 5

152 g. (1 mole) of trimethylhydroquinone, 300 cc. of o-nitrotoluene and 150 cc. of hexane were placed into a reaction flask. Under slight cooling 67 g. (0.988 mole) of boron trifluoride were introduced under stirring. The temperature was not allowed to rise above 20° C. After about ¾ of the boron trifluoride had been added, the reaction mixture became a dark brown two-phase solution. After 20 minutes, all of the trimethylhydroquinone-boron trifluoride had been absorbed. At the same time, crystallization of the trimethylhydroquinone boron trifluoride complex occurred. At this stage, the reaction mixture resembled a light yellow slurry, which was still capable of being stirred by the use of a heavy duty stirring motor. After cooling to −10° C., 296 g. (1 mole) of isophytol was introduced within 2 hours using a peristaltic pump in order to maintain the feed at a constant rate. The temperature was maintained at about −15° C. After about ⅔ of the isophytol had been introduced, the reaction mixture became a dark brown viscous solution. Stirring was continued at about −15° C. for 0.5 hour after the addition of the isophytol.

The cold reaction mixture was transferred to a 2 liter separatory funnel using 150 cc. of hexane for rinsing. The organic phase was washed two times with 300 cc. of water, separated and filtered over cotton-wool (Buchner funnel). The organic phase was transferred to the separatory funnel and was washed four times with 300 cc. portions of water. Each water layer was washed twice with 150 cc. portions of hexane. After combining all organic layers, the hexane was removed by evaporation. The nitrotoluene was stripped over a 30 cm. Vigreux column using water pump vacuum and an electrical heating mantel. High vacuum was then applied and some solid material sublimed into the Vigreux column. The distilling flask was cooled, the Vigreux column removed and the solid material washed out with acetone. The residue in distillation flask was distilled in a Vigreux column to produce 387 grams of pure dl-α-tocopherol (99 to 100 percent pure). This represents a yield of 90 percent.

What is claimed is:
1. A process for producing a complex of the formula:

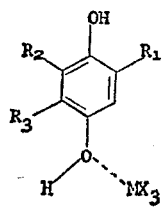

wherein M is a metal selected from the group consisting of boron and aluminum; X is fluorine or chlorine; and $R_1$, $R_2$ and $R_3$ are hydrogen or methyl, with the proviso that when M is aluminum, X is chlorine and with the further proviso that when M is boron, X is fluorine, comprising reacting, in the presence of a nitroalkane or nitroaryl, a hydroquinone of the formula:

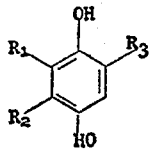

wherein $R_1$, $R_2$ and $R_3$ are as above, with a metal halide selected from the group consisting of aluminum trichloride and borontrifluoride.

2. The process of claim 1, wherein $R_1$, $R_2$ and $R_3$ are methyl.

3. The process of claim 1 wherein one mole of said metal halide is present per mole of said hydroquinone.

4. The process of claim 1 wherein said solvent is a nitro compound selected from the group consisting of nitroalkanes and nitroaryl compounds.

5. The process of claim 4, wherein said nitro compound is o-nitrotoluene.

6. The process of claim 1, wherein said reaction is carried out at a temperature of from 25° C. to −80° C. and said metal halide is aluminum trichloride.

7. A complex of the formula:

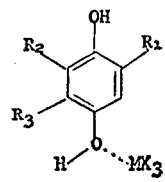

wherein M is a metal selected from the group consisting of aluminum and boron; X is fluorine or chlorine; and $R_1$, $R_2$ and $R_3$ are methyl or hydrogen with the proviso that when M is aluminum, X is chlorine and with the further proviso that when M is boron, X is fluorine.

8. The complex of claim 7 wherein $R_1$, $R_2$ and $R_3$ are methyl.

9. The complex of claim 7, wherein M is aluminum and X is chlorine.

10. The complex of claim 7, wherein M is boron and X is fluorine.

References Cited
UNITED STATES PATENTS 2,974,171  3/1961  Coffield _____ 260—448 R X

OTHER REFERENCES

Chemical Abstracts, vol. 53, p. 21905d (1959).
Chemical Abstracts, vol. 54, p. 8402h (1960).
Greenwood et al., Quart. Rev. (London), vol. 8, p. 26 (1954).

JAMES E. POER, Primary Examiner

H. M. S. SNEED, Assistant Examiner

U.S. Cl. X.R.

260—345.5, 606.5 B

UNITED STATES PATENT OFFICE
CERTIFICATE OF CORRECTION

Patent No. 3,651,113  Dated March 21, 1972

Inventor(s) Metlesics and Wehrli

It is certified that error appears in the above-identified patent and that said Letters Patent are hereby corrected as shown below:

Column 7, line 18 of claim 1 insert after nitroaryl

"organic solvent"

Signed and sealed this 13th day of November 1973.

(SEAL)
Attest:

EDWARD M. FLETCHER, JR.
Attesting Officer

RENE D. TEGTMEYER
Acting Commissioner of Patents